United States Patent [19]
Yu

[11] Patent Number: 6,053,451
[45] Date of Patent: Apr. 25, 2000

[54] REMOTE-CONTROL FLIGHT VEHICLE STRUCTURE

[76] Inventor: Shia-Giow Yu, No. 41, Lane 4, Kao Ma, Jen-mei Tsun, Niaosung Hsiang, Kaohsiung Hsien, Taiwan

[21] Appl. No.: 09/111,314

[22] Filed: Jul. 7, 1998

[51] Int. Cl.[7] ............................. B64C 15/00; B64C 29/00
[52] U.S. Cl. ..................... 244/12.2; 244/23 C; 244/23 R
[58] Field of Search ................................. 244/12.2, 12.1, 244/73 R, 23 C, 23 R, 189, 190, 15; 273/395, 396

[56] References Cited

U.S. PATENT DOCUMENTS

| | | | |
|---|---|---|---|
| 3,199,809 | 8/1965 | Modesti | 244/12.2 |
| 3,572,613 | 3/1971 | Porter | 244/12 |
| 3,633,849 | 1/1972 | Kling | 244/12.2 |
| 4,941,628 | 7/1990 | Sakamoto et al. | 244/12.2 |
| 5,102,066 | 4/1992 | Daniel | 244/12.2 |
| 5,383,810 | 1/1995 | Loving | 446/57 |
| 5,503,351 | 4/1996 | Vass | 244/34 A |

*Primary Examiner*—Peter M. Poon
*Assistant Examiner*—Vagnola K. Comer
*Attorney, Agent, or Firm*—Dorsey & Whitney LLP

[57] ABSTRACT

A remote-control flight vehicle structure includes an inner housing fixedly mounted, an outer housing rotatably mounted on the inner housing along a vertical axis thereof, an annular wing fixedly mounted on the outer periphery of the outer housing to rotate therewith and inclined with the horizontal plane about a first included angle, a plurality of baffles each fixedly mounted on the bottom portion of the annular wing along the radial direction thereof and each inclined with the annular wing about a second included angle, a platform fixedly mounted in the inner housing, a motor mounted on the platform, and a rotary axle including a first end portion rotatably mounted in the motor and a second end portion extending through the inner housing and fixed to the outer housing for rotating the outer housing.

12 Claims, 8 Drawing Sheets

REMOTE-CONTROL FLIGHT VEHICLE STRUCTURE

FIELD OF THE INVENTION

The present invention relates to a remote-control flight vehicle structure.

BACKGROUND OF THE INVENTION

The present invention has arisen to provide a remote-control flight vehicle structure comprising a plurality of electromagnetic positioners which can be used to eliminate the inertial force exerted on the flight vehicle structure during rotation such that the flight vehicle structure can fly in a stable manner.

SUMMARY OF THE INVENTION

In accordance with one aspect of the present invention, there is provided a remote-control flight vehicle structure comprising an inner housing fixedly mounted, an outer housing rotatably mounted on the inner housing along a vertical axis thereof, a space defined between the inner housing and the outer housing, an annular wing fixedly mounted on the outer periphery of the outer housing to rotate therewith and inclined with the horizontal plane about a first included angle, a plurality of baffles each fixedly mounted on the bottom portion of the annular wing along the radial direction thereof and each inclined with the annular wing about a second included angle, a platform fixedly mounted in the inner housing, a motor mounted on the platform, and a rotary axle including a first end portion rotatably mounted in the motor and a second end portion extending through the inner housing and fixed to the outer housing for rotating the outer housing.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
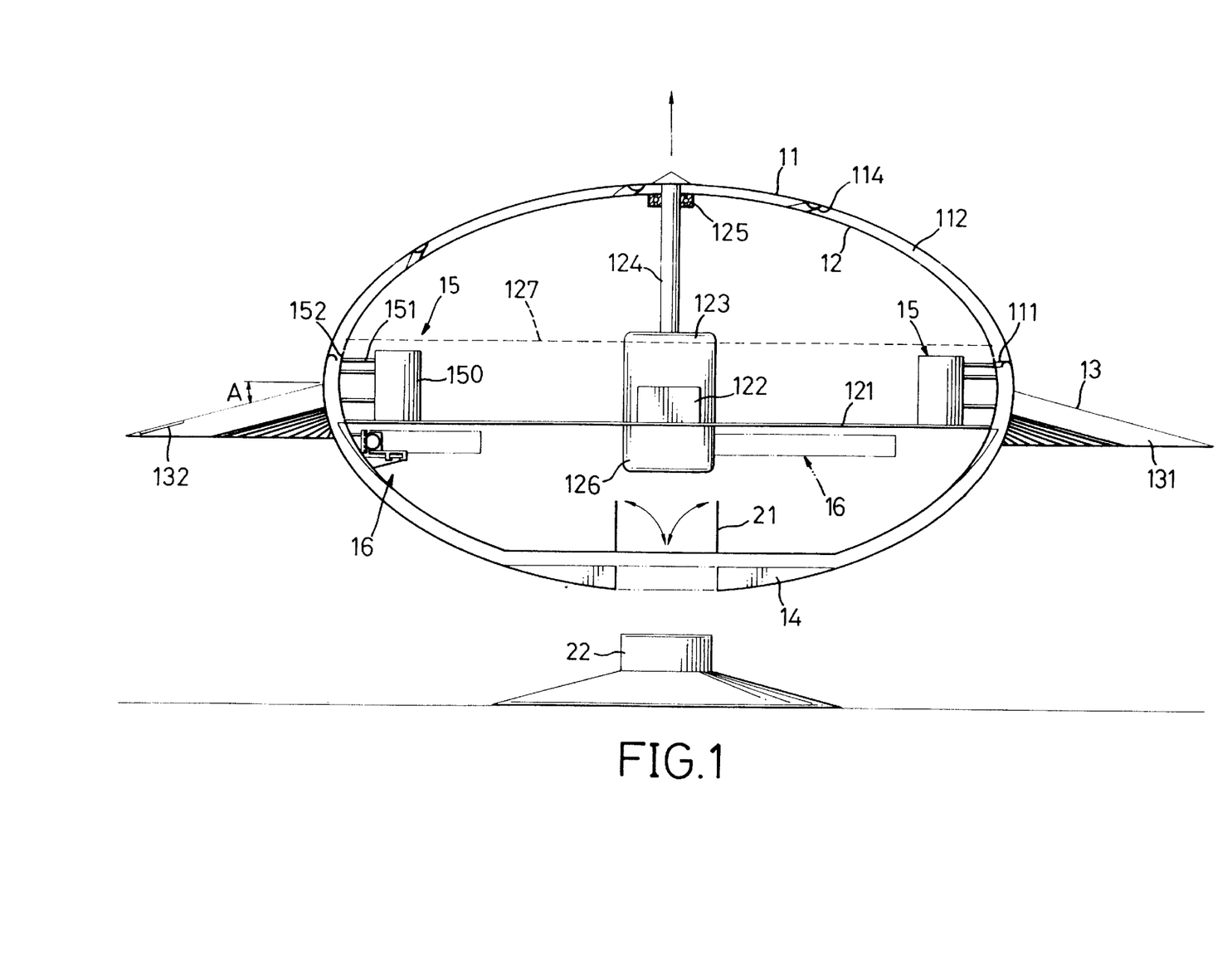
FIG. 1 is a front plan cross-sectional view of a remote-control flight vehicle structure in accordance with the present invention.
Figure 2:
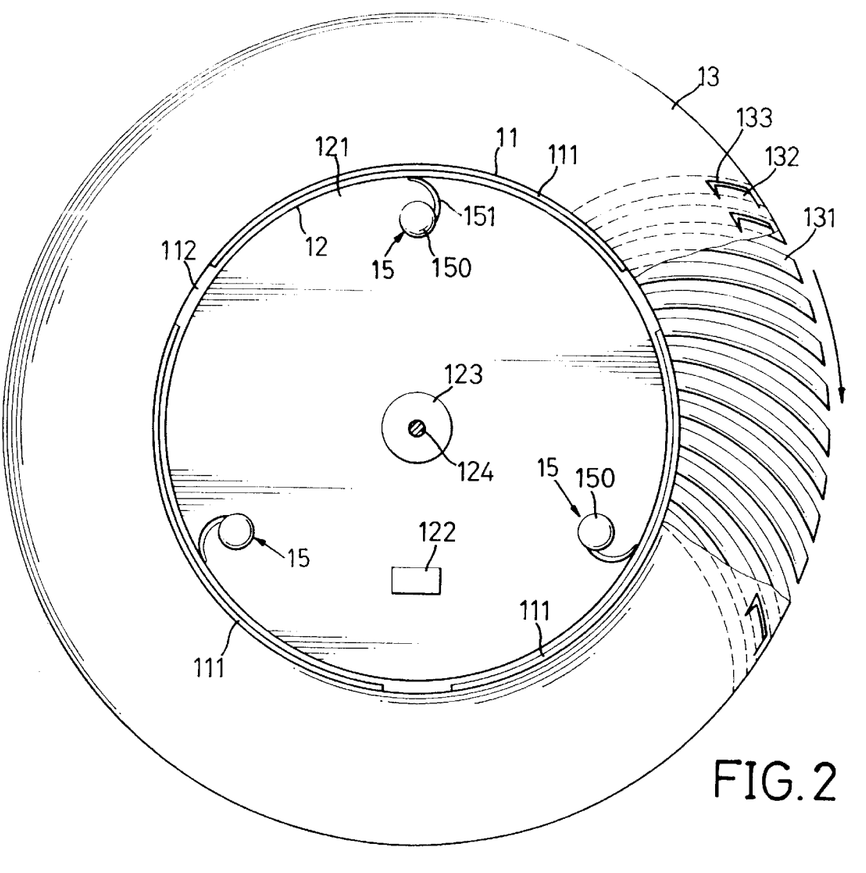
FIG. 2 is a top plan cross-sectional view of the flight vehicle structure as shown in FIG. 1.
Figure 3:
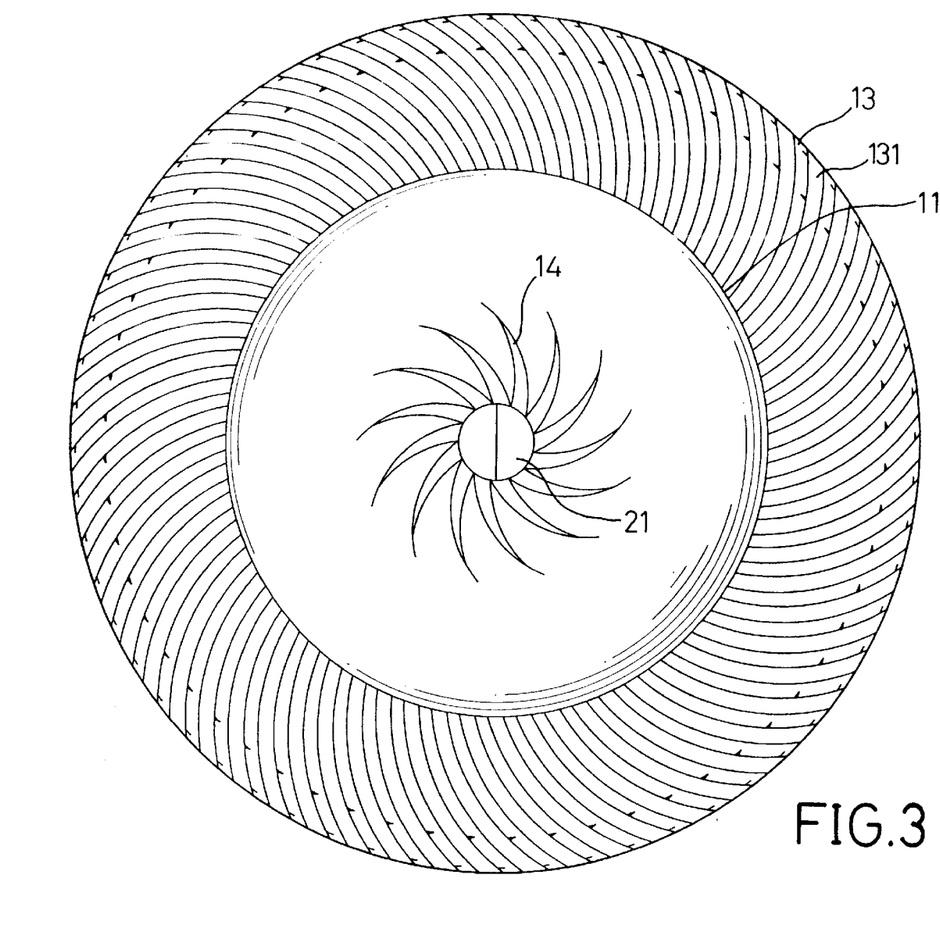
FIG. 3 is a bottom plan cross-sectional view of the flight vehicle structure as shown in FIG. 1.
Figure 4:
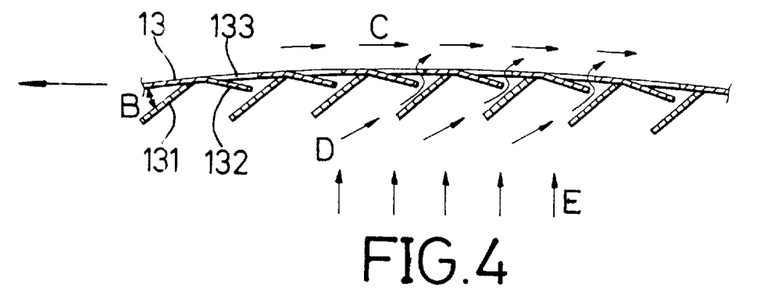
FIG. 4 is a side plan cross-sectional view of the flight vehicle wing structure as shown in FIG. 1.

Referring to the drawings and initially to FIGS. 1–4, a remote-control flight vehicle structure in accordance with the present invention comprises an inner housing 12 fixedly mounted, an outer housing 11 rotatably mounted on the inner housing 12 along a vertical axis thereof, a space 112 defined between the inner housing 12 and the outer housing 11, an annular wing 13 fixedly mounted on the outer periphery of the outer housing 11 to rotate therewith and inclined with the horizontal plane about a first included angle (A) as shown in FIG. 1, a plurality of baffles 131 each fixedly mounted on the bottom portion of the annular wing 13 along the radial direction thereof and each inclined with the annular wing 13 about a second included angle (B) as shown in FIG. 4, a platform 121 fixedly mounted in the inner housing 12, a motor 123 mounted on the platform 121, a rotary axle 124 including a first end portion rotatably mounted in the motor 123 and a second end portion extending through the inner housing 12 and fixed to the outer housing 11 to rotate the outer housing 11 relative to the inner housing 12, and a ball bearing 125 mounted between the second end portion of the rotary axle 124 and the inner housing 12.

Preferably, the first included angle (A) is in the range between fifteen and thirty degrees, and the second included angle (B) is equal to thirty degrees.

A fuel container 126 is mounted on the motor 123 to supply fuel to it, and a receiver 122 is mounted on the platform 121 to receive rf signals from a remote controller (not shown) on the ground so as to control the rotation speed of the motor 123.

The annular wing 13 contains a plurality of slots 133 each located between two adjacent baffles 131, and includes a plurality of guiding plates 132 each located under one of the corresponding slots 133 and each extending along a direction opposite to that of the baffle 131 as shown in FIG. 4.

The outer housing 11 has an open bottom portion, and a plurality of blades 14 are each radially mounted in the open bottom portion of the outer housing 11 as shown in FIG. 3. An electrically controlled door 21 is mounted in the open bottom portion of the outer housing 11 and can be opened as shown in FIG. 1 such that the flight vehicle structure can be supported by a base 22 when landing.

In operation, the rotary axle 124 can be rotated by the motor 123 when the receiver 122 receives the signals sent from the remote controller so as to rotate the outer housing 11 relative to the inner housing 12, thereby rotating the annular wing 13. In such a situation, the air current C above the annular wing 13 flows smoothly at a faster speed such that the pressure above the annular wing 13 is lower. The air current D under the annular wing 13 is retarded by the baffles 131 so as to flow at a lower speed such that the pressure under the annular wing 13 is greater than that above the annular wing 13, thereby introducing an upward air current E which provides lift on the annular wing 13 to lift the flight vehicle structure. Each of the guiding plates 132 can be used to guide the air current D to flow upward through the slots 133.

Figure 5:
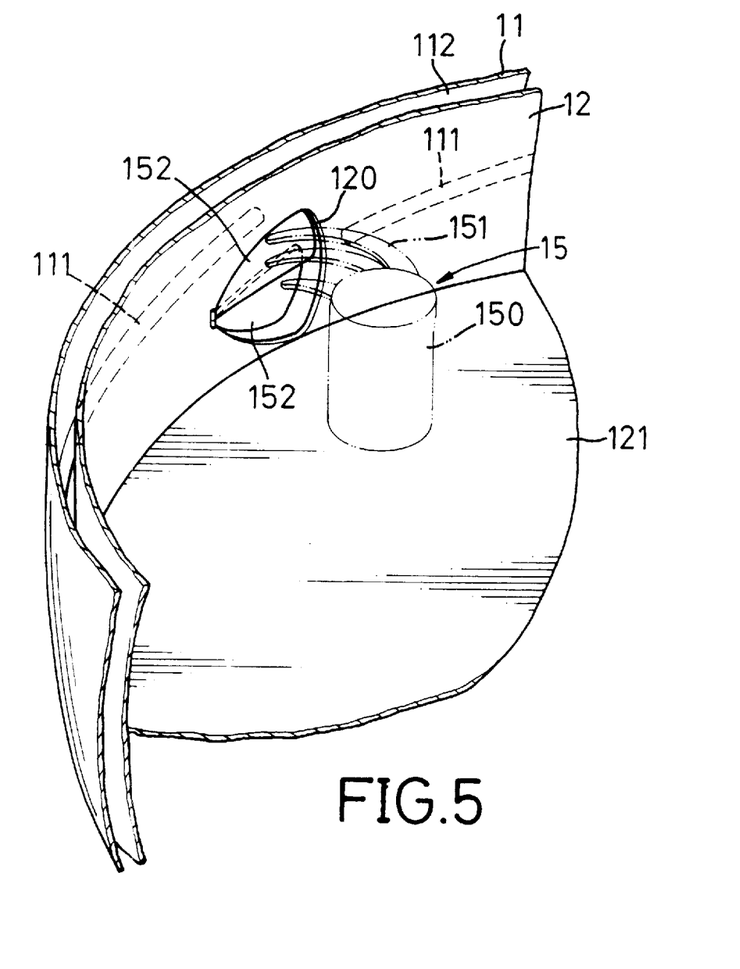
FIG. 5 is a partially cut-away perspective view of the driving mechanism in accordance with the present invention.
Figure 6:
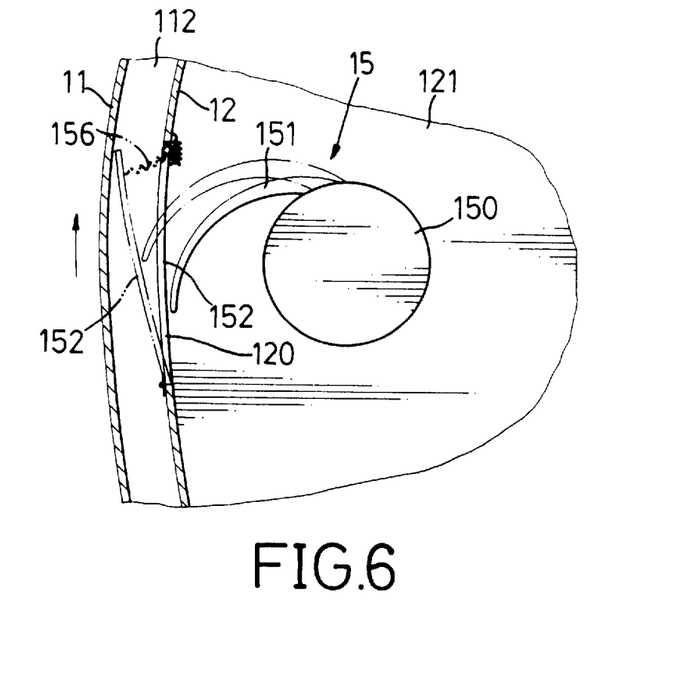
FIG. 6 is a top plan cross-sectional view of the driving mechanism as shown in FIG. 5.
Figure 7:
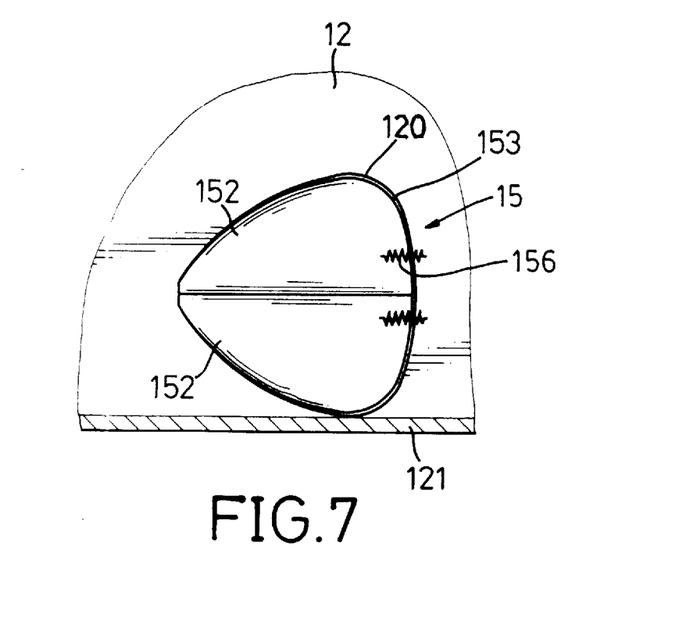
FIG. 7 is a front plan cross-sectional view of the driving mechanism as shown in FIG. 5.

Referring now to FIGS. 5–7 with reference to FIGS. 1 and 2, the inner housing 12 transversely contains a plurality of cavities 120, and the flight vehicle structure further comprises a plurality of driving mechanisms 15 each including two juxtaposed pressure adjusting doors 152 each pivotally received in one of the cavities 120, an actuator 150 mounted on the platform 121, and two flexible arcuate pushing arms 151 each including a first end portion mounted on and driven by the actuator 150 and a second end portion abutting one of the two corresponding pressure adjusting doors 152, whereby each of the two pressure adjusting doors 152 can be pressed by each of the pushing arms 151 to extend into the space 112.

A plurality of arcuate guiding plates 111 are each mounted in the outer housing 11 and each located adjacent to one of the two pressure adjusting doors 152 of each of the driving mechanisms 15.

Each of the driving mechanisms 15 further comprises a sealing member 153 mounted between the inner housing 12 and the two pressure adjusting doors 152, and two springs 156 each including a first end portion attached to the inner housing 12 and a second end portion attached to one of the two corresponding pressure adjusting doors 152.

In operation, the pressure in the space 112 between the inner housing 12 and the outer housing 11 is initially retained at a steady state when the outer housing 11 is rotated relative to the inner housing 12. When the receiver 122 receives a signal sent from the remote controller on the ground, the actuator 150 can be actuated to move one of the two pushing arms 151 so as to press one of the two corresponding pressure adjusting doors 152 into the space 112, thereby connecting the space 112 to the inner housing 12 via the cavity 120 such that the pressure in the space 112 will be changed locally, thereby controlling the flight direction of the flight vehicle structure. An electromagnetic coil 127 is mounted on the inner housing 12 for enhancing the stability of flight of the flight vehicle structure.

Figure 8:
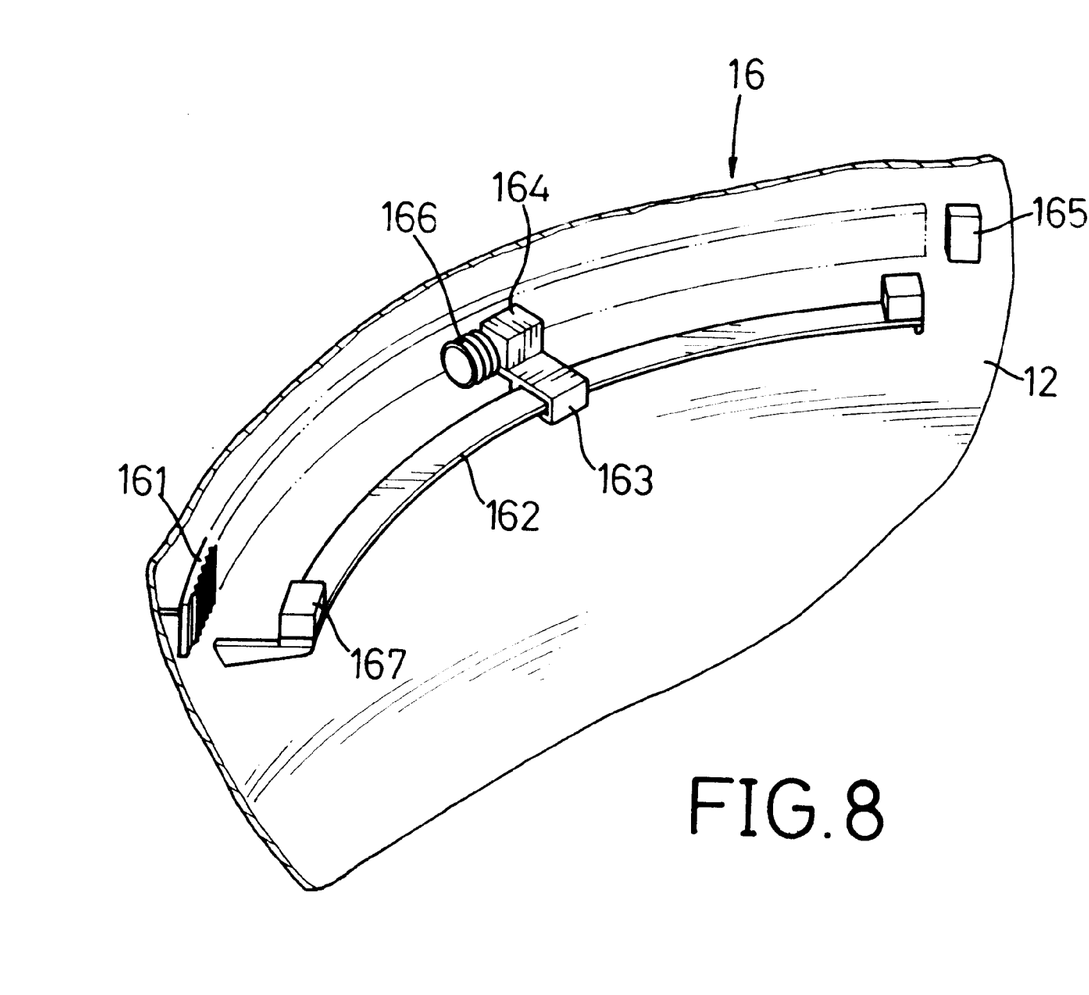
FIG. 8 is a partially cut-away perspective view of an electromagnetic positioner in accordance with the present invention.

Referring now to FIG. 8 with reference to FIG. 1, the flight vehicle structure further comprises a plurality of electromagnetic positioners 16 each comprising a rack 161 fixedly mounted on the inner periphery of the inner housing 12, a position detector 165 fixedly mounted on the inner periphery of the inner housing 12 and located adjacent to one end portion of the rack 161, a guiding track 162 fixedly mounted on the inner periphery of the inner housing 12 and located under the rack 161, two magnets 167 each fixedly mounted on one of the two end portions of the guiding track 162, a slide 163 slidably mounted on the guiding track 162, a step motor 164 fixedly mounted on the slide 163 to slide therewith, and a worm wheel 166 rotatably mounted on the step motor 164 and meshing with the rack 161. The slide 163 is made of a magnetic material and has a polarity different from that of each of the two magnets 167.

In operation, the inner housing 12 tends to rotate with the outer housing 11 by means of action of the inertial force when the outer housing 11 is rotated. In such a situation, the position detector 165 will detect variation of the position of the inner housing 12 so as to actuate the step motor 164 which respectively drives the worm wheel 166 and the slide 163 to move along the rack 161 and the guiding track 162. When the slide 163 approaches one of the two magnets 167, the respective magnet 167 will exert a repelling force on the slide 163 due to the opposite polarity therebetween, thereby eliminating the inertial force exerted on the inner housing 12.

Figure 9:
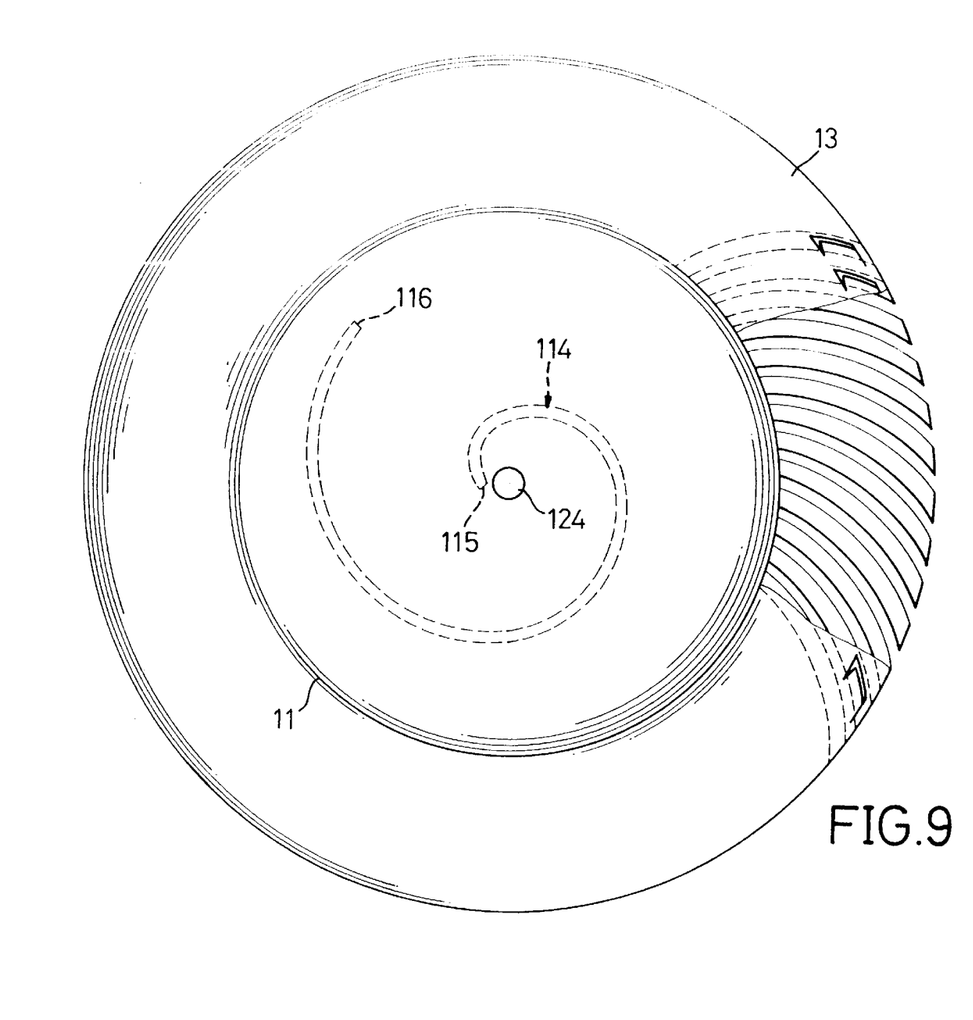
FIG. 9 is a top plan view of the helical pipe in accordance with the present invention.

Referring now to FIG. 9 with reference to FIG. 1, the flight vehicle structure further comprises a helical pipe 114 including a closed end portion 115 and an open end portion 116. By such an arrangement, current will be introduced into the helical pipe 114 via the open end portion 116 so as to form a static pressure, thereby increasing the buoyancy of the flight vehicle structure.

Figure 10:
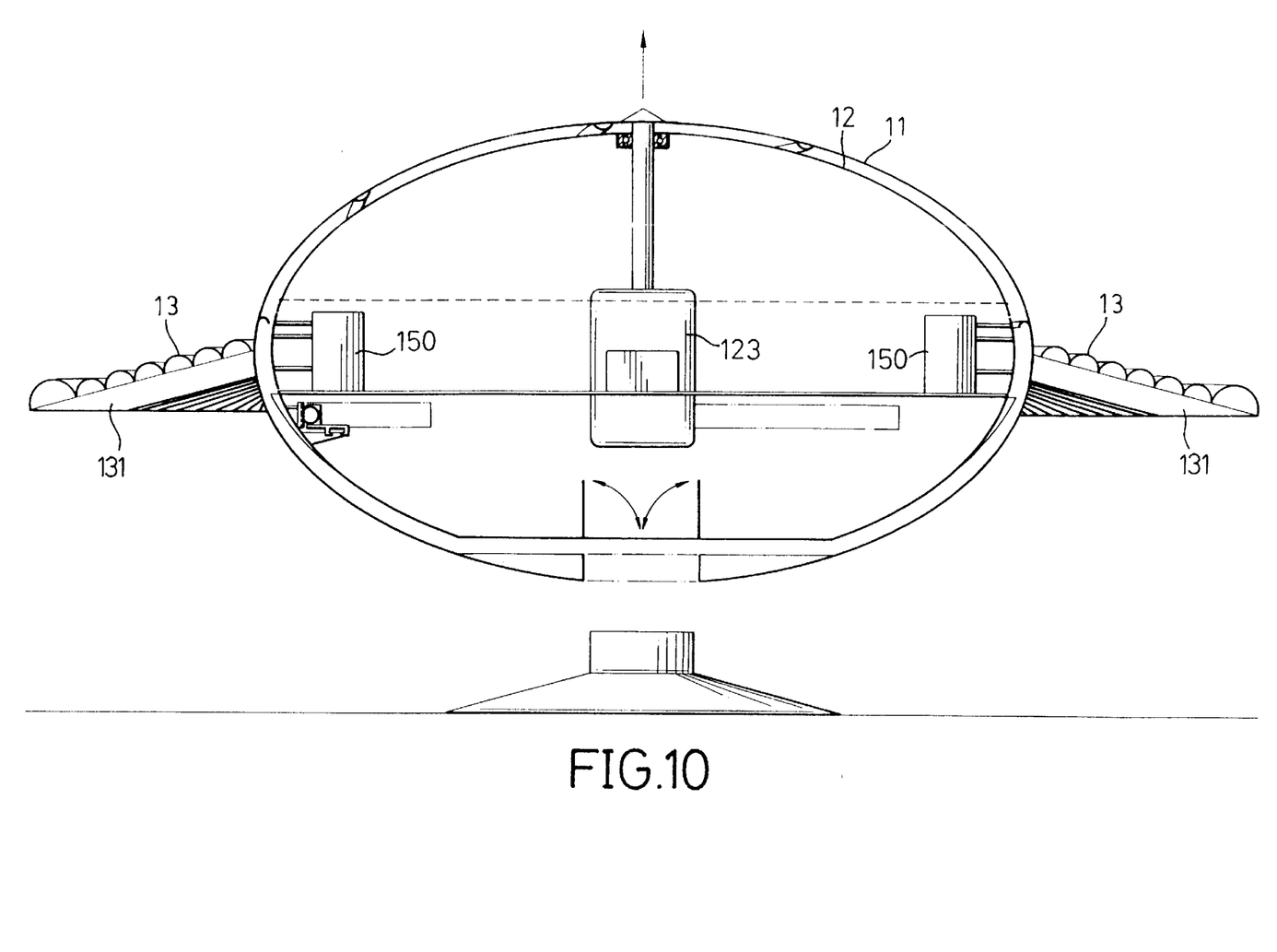
FIG. 10 is a front plan cross-sectional view of a remote-control flight vehicle structure in accordance with another embodiment of the present invention.

Referring now to FIG. 10 with reference to FIG. 1, in accordance with another embodiment of the present invention, the annular wing 13 is formed with a corrugated configuration which can be used to store air pressure therein and increase the area of the annular wing 13, thereby increasing the buoyancy of the flight vehicle structure.

It should be clear to those skilled in the art that further embodiments may be made without departing from the scope and spirit of the present invention.

What is claimed is:

1. A remote-control flight vehicle structure comprising:
   an inner housing (12) fixedly mounted;
   an outer housing (11) rotatably mounted on said inner housing (12) along a vertical axis thereof, and a space (112) defined between said inner housing (12) and said outer housing (11);
   an annular wing (13) fixedly mounted an the outer periphery of said outer housing (11) to rotate therewith and inclined with a horizontal plane about a first included angle;
   a plurality of baffles (131) each fixedly mounted on a bottom portion of said annular wing (13) along a radial direction thereof and each inclined with said annular wing (13) about a second included angle;
   a platform (121) fixedly mounted in said inner housing (12); and
   a motor (123) mounted on said platform (121), and a rotary axle (124) including a first end portion rotatably mounted in said motor (123) and a second end portion extending through said inner housing (12) and fixed to said outer housing (11) for rotating said outer housing (11).

2. The remote-control flight vehicle structure in accordance with claim 1, wherein said first included angle has a range between fifteen and thirty degrees.

3. The remote-control flight vehicle structure in accordance with claim 1, wherein said second included angle is equal to thirty degrees.

4. The remote-control flight vehicle structure in accordance with claim 1, wherein said annular wing (13) contains a plurality of slots (133) each located between two adjacent baffles (131), and includes a plurality of guiding plates (132) each located under one of said corresponding slots (133) and each extending along a direction opposite to that of said baffle (131).

5. The remote-control flight vehicle structure in accordance with claim 1, wherein said outer housing (11) has an open bottom portion, and a plurality of blades (14) are each radially mounted in said open bottom portion of said outer housing (11).

6. The remote-control flight vehicle structure in accordance with claim 1, further comprising a ball bearing (125) mounted between said second end portion of said rotary axle (124) and said inner housing (12).

7. The remote-control flight vehicle structure in accordance with claim 1, further comprising a plurality of electromagnetic positioners (16) each comprising a rack (161) fixedly mounted on the inner periphery of said inner housing (12), a position detector (165) fixedly mounted on said inner periphery of said inner housing (12) and located adjacent to one end portion of said rack (161), a guiding track (162) fixedly mounted on the inner periphery of said inner housing (12) and located under said rack (161), two magnets (167) each fixedly mounted on one of the two end portions of said guiding track (162), a slide (163) slidably mounted on said guiding track (162), a step motor (164) fixedly mounted on said slide (163) to slide therewith, and a worm wheel (166) rotatably mounted on said step motor (164) and meshing with said rack (161).

8. The remote-control flight vehicle structure in accordance with claim 1, further comprising a fuel container (126) mounted on said motor (123) for supplying fuel to it.

9. The remote-control flight vehicle structure in accordance with claim 1, further comprising a receiver (122) mounted on said platform (121) for receiving rf signals so as to control the rotation speed of said motor (123).

10. The remote-control flight vehicle structure in accordance with claim 1, wherein said inner housing (12) transversely contains a plurality of cavities (120), and said flight vehicle structure further comprises a plurality of driving mechanisms (15) each including two juxtaposed pressure adjusting doors (152) each pivotally received in one of said cavities (120), an actuator (150) mounted on said platform (121), and two flexible arcuate pushing arms (151) each including a first end portion mounted on and driven by said actuator (150) and a second end portion abutting one of said two corresponding pressure adjusting doors (152), whereby each of said two pressure adjusting doors (152) can be pressed by each of said pushing arms (151) to extend into said space (112).

11. The remote-control flight vehicle structure in accordance with claim 10, wherein each of said driving mechanisms (15) further comprises two springs (156) each including a first end portion attached to said inner housing (12) and a second end portion attached to one of said two corresponding pressure adjusting doors (152).

12. The remote-control flight vehicle structure in accordance with claim 10, further comprising a plurality of arcuate guiding plates (111) each mounted in said outer housing (11) and each located adjacent to one of said two pressure adjusting doors (152) of each of said driving mechanisms (15).

* * * * *